United States Patent Office 3,520,841
Patented July 21, 1970

3,520,841
OIL MODIFIED ACIDIC POLYESTERS AND COATING COMPOSITIONS THEREOF
Richard B. Graver, Louisville, Ky., and Stephen F. Hudak, Minnneapolis, Minn., assignors to Ashland Oil & Refining Company, Ashland, Ky., a corporation of Kentucky
No Drawing. Continuation-in-part of application Ser. No. 570,761, Aug. 8, 1966. This application Aug. 2, 1968, Ser. No. 771,687
Int. Cl. C08g 17/16; C09d 3/64
U.S. Cl. 260—22
14 Claims

ABSTRACT OF THE DISCLOSURE

Acidic polyesters having acid values of at least 50 are prepared by the esterification of:
(a) a polycarboxylic acid and
(b) the alcoholysis product of
 (1) a triglyceride oil such as safflower oil and
 (2) a polyhydric alcohol.
These acidic polyesters are highly soluble in volatile organic solvents and form superior coatings when combined with epoxides.

---

This application is a continuation-in-part of copending application Ser. No. 570,761, now abandoned, filed Aug. 8, 1966, the subject matter of which is hereby incorporated by reference. Other references relating to coating compositions obtained by the reaction of acidic polyesters and/or acidic alkyd resins with epoxides include U.S. Pats. 3,196,117; 3,196,119 and 3,218,274.

According to U.S. 3,218,274, coating systems containing acidic polyesters prepared from chlorinated polycarboxylic acids are the most reactive at room temperature. One preferred acidic polyester for use in preparing room temperature curing coating compositions is one prepared from a mixture of only pentaerythritol, phthalic anhydride, and hexachloroendomethylene tertahydrophthalic acid (i.e. chlorendic acid) or its anhydride.

Unfortunately, the preferred acidic polyesters are insoluble in mineral spirits and their solubility in aromatic solvents (such as xylol) is limited. Consequently, the acidic polyesters described in that patent were ordinarily diluted with a mixture of xylene and an active solvent such as Cellosolve acetate, MIBK, or butyl acetate. Even so, infinite reduction or dilution of certain acidic polyesters with xylol was not possible. Furthermore, there has been some concern over the possible instability on prolonged aging of the package containing the polyester.

It has now been discovered that it is possible to improve the solubility characteristics of the acidic polyesters shown in U.S. 3,218,274 in organic solvents and in particular in mineral spirits by chemical modification of the acidic polyester with a triglyceride oil. The oil is not reacted directly with the polyester but rather an alcoholysis product of the oil and a polyhydric alcohol such as pentaerythritol is first formed and this alcoholysis product is then reacted with a polycarboxylic acid to form the acidic polyesters of the present invention.

The improvement in solubility obtained by the described chemical modification is an important feature of the present invention. Partial or complete elimination of aromatic and active solvents such as xylene and Cellosolve acetate means that the odor of paints made from these coating vehicles can be markedly improved and toxicity problems reduced. Furthermore, certain recently enacted city ordinances place severe limitations on the amount per day of aromatic solvents that can be discharged into the atmosphere. Thus, the use of mineral spirits enables one to use greater amounts of paint without exceeding these limits. Still further, the ability to be infinitely or completely diluted with a solvent becomes important when cleaning equipment, brushes and the like. Incomplete solubility will result in the formation of gummy particles, etc. The acidic polyesters prepared by the process of the present invention involve lower raw material costs and therefore result in a commercial advantage even though the sum of the film properties of coating compositions prepared therefrom are not superior to similar coating compositions obtained by such methods as described in copending application Ser. No. 570,761.

The terms "coating vehicle," two-package coating vehicle," "paint," "varnish," "cure," "infinitely soluble" and "partially soluble" have been defined in our copending application Ser. No. 570,761 and are employed in the same sense herein.

The term "mineral spirits" as used herein means a solvent useful in preparing paints or varnishes which consists of at least 60% by volume and preferably at least 70% by volume (e.g. above 80%) of saturated hydrocarbons (e.g. paraffinic or naphthenic hydrocarbons). Such solvents are well-known to those skilled in the paint art and are readily available in commercial quantities. Suitable solvents include VM&P naphtha, Amsco 46, Varsol 1 and 2, commercial "mineral spirits," etc. The composition of such solvents can be determined by ASTM method D–1319 using fluorescent indicator analysis optionally assisted by mass spectrography. Typically, the boiling range (5%–95% distilled) of these solvents will be from 250°–425° F., and more usually from 300°–400° F., e.g. 320°–390° F.

The acidic polyesters of the present invention are those having an acid value of at least 50 and are the esterification reaction product of (A) a polycarboxylic acid and (B) the alcoholysis product of (1) a triglyceride oil and (2) a polyhydric alcohol having at least three hydroxyl groups.

The polycarboxylic acids useful to form the acidic polyesters of the present invention can be nonchlorinated or chlorinated. Examples of suitable nonchlorinated polycarboxylic acids include among others maleic, fumaric, trimeletic, tetrahydrophthalic, hexahydrophthalic, isophthalic, phthalic and their extant anhydrides. Phthalic anhydride is the preferred nonchlorinated polycarboxylic acid.

Suitable chlorinated polycarboxylic acids are dichloro maleic acid, hexachlorophthalic acid, tetrachloropththalic acid, monochlorophthalic acid, hexachloroendomethylene tetraydrophthalic acid and the like. Mixtures of chlorinated polycarboxylic acids can be used. Where they exist, the corresponding anhydrides can be used. Hexachloroendomethylene tetrahydrophthalic acid (i.e. chlorendic acid) and its anhydride is the preferred chlorinated polycarboxylic acid.

The triglyceride oils useful in the present invention can be of the drying or non-drying type, and are generally those which are naturally occurring. Examples of suitable triglyceride oils include among others linseed, tung, castor, dehydrated castor, safflower, soya, tall, cottonseed, olive and cocoanut oils. These oils are employed in an amount sufficient to render the acidic polyesters soluble in mineral spirits.

The polyhydric alcohols useful in preparing the acidic polyesters are the simple polyhydric alcohols containing three or more hydroxy groups such as glycerol, hexane-1, 2,6-triol, trimethylol ethane, trimethylol propane, sorbitol, pentaerythritol, or dipentaerythritol. Typically, these simple or common polyhydric alcohols will contain from 2–15, e.g. 3–8 carbon atoms, and 3 or more (e.g. 3–8) free or unreacted hydroxyl groups. Mixtures of such polyhydric alcohols can be employed. Additionally mixtures of major proportions of such alcohols with minor proportions of dihydric alcohols such as ethylene glycol, propylene glycol or neopentyl glycol can be employed. Preferably the proportion of such divalent alcohols is below 10% by weight, and the polyhydric alcohol has on the average 2.5 hydroxyl groups. The saturated aliphatic polyhydric alcohols, particularly the unsubstituted saturated aliphatic polyhydric alcohols having at least three hydroxyl groups attached to a hydrocarbyl backbone are preferred. Still further, polyhydric alcohols having no hydrogen atoms attached to their beta carbon atoms are preferred, e.g. trimethylol ethane, trimethylol propane, pentaerythritol and dipentaerythritol. Pentaerythritol (pure containing 4% dipentaerythritol or technical grade containing 14% dipentaerytheitol) are especially preferred.

The acidic polyesters of the present invention are produced by a two step process comprising first interesterifying the triglyceride and the polyhydric alcohol to form an alcoholysis product and then esterifying this product with the polycarboxylic acid. The interesterification can be accomplished by any well-known process and simply by mixing the triglyceride oil and polyhydric alcohol and heating at interesterification temperatures and generally between 150 and 280° C. and preferably between 220 and 260° C. in the presence of an acidic or basic catalyst. Basic catalysts such as the alkali metal hydroxides, an example of which is lithium hydroxide, are preferred because of superiority in speed and completeness of reaction. The reaction is continued until equilibrium has been reached or substantially reached as determined by solubility of the alcoholysis product when diluted to an equal volume with methanol, which generally occurs within 1 to 4 hours within the preferred temperature range.

According to the present invention the alcoholysis product is then esterified with a polycarboxylic acid, optionally in the presence of a reflux solvent. The esterification can be accomplished by any well-known process and simply by heating the reactants at esterification temperatures and generally between 120 and 260° C. preferably 120 and 180° C. until most or all of the water of esterification has been removed. When the anhydride is used as the source of polycarboxylic acid, very little water of esterification forms. All of the polycarboxylic acid is preferably added at one time in order to inhibit polyesterification.

In a preferred embodiment of the present invention color stabilizers are employed during the esterification in an amount sufficient to prevent or inhibit darkening of the product and generally from 0.01 to 1.0 weight percent based on the non-volatile weight of the product. Examples of suitable color stabilizers include among others 2,6-di-t-butyl-p-cresol, phosphoric acid, triphenyl phosphite, and mixtures thereof. The preferred color stabilizer is a mixture of equal parts by weight of phosphoric acid and 2,6-di-t-butyl-p-cresol.

The ratios of triglyceride oil, polyhrydric alcohol and polycarboxylic acid are critical to the present invention for if too little oil is used the resultant polyesters are not soluble in mineral spirits whereas if too much oil is used there are insufficient unreacted hydroxyl groups present in the alcoholysis product to react with the polycarboxylic acid. This results in a polyester of too low an acid number to be sufficiently reactive with the epoxy component. The acid number can be raised by the presence of free polycarboxylic acid. However free polycarboxylic acid is undesirable because its presence in cured coatings provides points of chemical attack and results in eventual degradation of the coating. Thus the preferred acidic polyesters of the present invention are those which are substantially free of unreacted polycarboxylic acid but still have the desired acid number. This is vastly different than the low acid number oil modified alkyds produced by alcoholysis of triglyceride oils which are well-known in the art. The acidic polyesters of the present invention have acid values of at least 50 and preferably between 85 and 120. At acid values much less than 50 the acidic polyesters coreact too sluggishly with the epoxy component and yield cured coatings of inferior properties. Thus the molar ratios of triglyceride oil to polyhydric alcohol can be 0.1:1 to 2.0:1 and preferably 0.3:1 to 1.0:1.

The ratios of carboxylic groups to hydroxyl groups in the esterification reaction mixture is likewise critical to the present invention for it is desired to esterify all unreacted hydroxyl group present in the alcoholysis product in order that the acidic polyesters will have a hydroxyl value of less than 10 and preferably zero. The ratio of carboxyl groups to hydroxyl groups can be between 1.5:1 and 2.5:1. At lower ratios insufficient esterification occurs to give a low acid value partially reacted product and at greater ratios the mixture tends to contain undesirable free polycarboxylic acid. The calculation of specific molar ratios of carboxyl to hydroxyl group is well within the skill of the art since the alcoholysis product will normally have a number of free hydroxyl groups equivalent to those present in the initial unreacted polyhydric alcohol. Thus by carboxyl group is meant one supplied by the polycarboxylic acid and not those supplied by the triglyceride which may be transiently present during alcoholysis. A dicarboxylic acid anhydride group is the equivalent of two carboxyl groups. When employing castor oil the hydroxyl group on the ricinoleic acid moiety must be considered a free hydroxyl group in determining the carboxyl to hydroxyl group ratio.

The epoxy component can be any heretofore found to be reactive with acidic polyester to form coatings having desirable properties and include among others epoxidized oils, epoxidized fatty acid esters, epoxy resins, monomeric polyepoxides, and mixtures thereof. These epoxy components generally have an oxirane value of 4 to 10%. Examples of suitable epoxidized oils include among others epoxidized soybean oil such as that having an oxirane content of 6.5%, sold under the trade name ADMEX 710, epoxidized linseed oil, etc. Examples of suitable epoxidized fatty acid esters include among others epoxidized methyloleate and epoxidized tall oil fatty acid ester of pentaerythritol. The epoxidized esters are generally the reaction product of a polyhydric alcohol (e.g., pentaerythritol, soribtol, trimethylolpropane, anhydroenneaheptitol) and an unsaturated fatty acid subsequently epoxidized by methods well known in the art. Examples of monomeric polyepoxides include among others the cyclic diepoxides such as those produced in accordance with U.S. Pats. 3,235,569; 3,238,227; 3,244,732; 3,264,271; 3,278,456; and 3,280,153 as well as 3,4-epoxy-6-methylcyclohexyl methyl 3,4 - epoxy - 6-methylcyclohexanecarboxylate available under the trade name UNOX 201. The epoxy resins useful in the present invention can be produced by a wide variety of processes such as those described in U.S. Pats. 2,846,410; 2,886,473; 2,893,978; 2,902,398; 2,921,049; 2,933,472; 2,940,986; 2,943,096; 2,944,035; 2,972,590; 2,975,148; 2,987,498; 3,047,537; 3,093,661; 3,096,349; 3,206,482; 3,264,370; 3,328,353; and 3,211,684. These epoxy resins are generally the reaction product of a polyhydric phenol and epihalohydrin, one example of which is the reaction product of bisphenol-A and epichlorohydrin in a molar ratio of at least one mole of epichlorohydrin per mole of bisphenol-A. Such an epoxy resin is sold under the trade name EPON 828.

The epoxy component and the acidic polyester can be mixed in any ratio that will give a coating vehicle that cures to give the desired properties and generally in weight ratios of 2:1 to 1:2, and preferably 1:1. Specific formulations can easily be calculated by those skilled in the art given the acid number of the acidic polyester and the oxirane content of the epoxy component, and assuming that one carboxyl group reacts with one oxirane ring.

The coating vehicles of the present invention comprising the acidic polyester and the epoxy component find utility as coatings for substrates of wood, ceramic, ferrous metals, non-ferrous metals, and the like. When applied by such procedures as dipping, brushing, or spraying, these novel compositions can be used to protect the coated substrate from the adverse effects of weather, water, and air. Thus, such useful objects as wooden and metal, boats, lawn chairs, houses, barns, and the like, can be advantageously coated with these novel compositions.

The invention may be better understood by reference to the following examples, in which all parts and percentages are by weight unless otherwise indicated. These examples are illustrative of certain embodiments designed to teach those skilled in the art how to practice the invention and are not intended to limit the scope of the invention in any manner.

EXAMPLE 1

This example illustrates the synthesis of an acidic polyester of the present invention.

327.5 grams of commercial cocoanut oil and 150.0 grams of technical pentaerythritol are charged to a glass flask equipped with a stirrer, thermometer and Dean-Stark water separation trap. The flask is then heated and 0.4 gram of lithium hydroxide (alcoholysis catalyst) is added at a temperature of 300–320° F. Heating is continued until a temperature of 480–500° F. is obtained. The reaction mix is held at 480–500° F. for 1½ hours to ensure adequate alcoholysis (transesterification). The alcoholysis product is then cooled to 260–290° F. 148.0 grams of phthalic anhydride, 1164.0 grams of chlorendic acid and 422.0 grams of Solvesso 100 (an aromatic solvent) are then added to the reaction mix. The flask is heated to reflux temperature and the water of esterification removed. A good reflux rate is maintained throughout the reaction. A maximum temperature of 350–365° F. is obtained at the terminal stages of the reaction. Water of esterification ceases to be evolved soon after the temperature reaches 350–365° F. After water ceases to be evolved, the temperature is maintained for an additional ½ to 1 hour. The reaction mix is then cooled to about 300° F. and cut to 60% non-volatile (N.V.) with mineral spirits (Amsco's regular mineral spirits).

Preparation of this fatty modified polyester requires about 4 hours of reaction time measured from the first evidence of water evolution until the time the reaction mixture is cooled.

The final product is at 60% N.V., has a viscosity of U on the Gardner-Holdt scale (6.3 stokes), has an acid number of 103.0 (corrected to 100% N.V.) and a Gardner color of 7.

EXAMPLE 2

This example illustrates the synthesis of an acidic polyester of the present invention employing color stabilizers.

The procedure of Example 1 is repeated employing the same procedure, times, conditions, and reactants except that 0.03% (based on solids) phosphoric acid and 0.03% (2,6-di-tert-butyl-p-cresol) are added to the flask at the time that the phthalic anhydride, chlorendic acid and Solvesso 100 are charged (260–290° F.). The final constants of this product are 60% N.V., acid number 101.0, viscosity U+ (6.4 stokes) and a color of 5½.

EXAMPLE 3

This example illustrate the synthesis of an acidic polyester of the present invention employing different reactants.

The procedure of Example 1 is repeated employing the same procedure, times and conditions except that the following quantities of the following ingredients are employed in the alcoholysis step:

| Ingredient: | Quantity (grams) |
| --- | --- |
| Non-break Safflower oil | 440.0 |
| Technical pentaerythritol | 150.0 |
| Lithium hydroxide | 0.6 | and the following quantities of the following ingredients are employed in the esterification step:

| Ingredient: | Quantity (grams) |
| --- | --- |
| Chlorendic acid | 1552.0 |
| Regular mineral spirits | 513.0 |
| Phosphoric acid | 0.6 |
| 2,6-di-tert-butyl-p-cresol | 0.6 |

This product when cut to 60% N.V. with additional mineral spirits has the following constants:

| | |
| --- | --- |
| Percent N.V. | 60 |
| Viscosity (67.6 stokes) | Z 4¼ |
| Acid number | 101.0 |
| Color | 5½ |

When cut to 60% N.V. with an additional solvent blend to give a final solvent ratio of mineral spirits/Cellosolve acetate, 85/15, it has the following constants:

| | |
| --- | --- |
| Percent N.V. | 60 |
| Viscosity (3.0 stokes) | L |
| Acid number | 101.0 |
| Color | 5½ |

EXAMPLE 4

This example illustrates the synthesis of still another acidic polyester of the present invention employing different reactants.

The procedure, times and conditions except that the following quantities of the following ingredients are employed in the alcoholysis step:

| Ingredient: | Quantity (grams) |
| --- | --- |
| Castor oil | 163.7 |
| Technical pentaerythritol | 75.0 |
| Lithium hydroxide | 0.2 | and the following quantities of the following ingredients are employed in the esterification step:

| | Grams |
| --- | --- |
| Phthalic anhydride | 59.3 |
| Empol 1010 dimer acid | 63.7 |
| Chlorendic acid | 582.0 |
| Mineral spirits | 226.0 |
| Phosphoric acid | 0.6 |
| 2,6 - di - tert - butyl - p - cresol | 0.6 |

This product is cut to 60% N.V. with an additional solvent blend to give a final solvent ratio of mineral spirits/Cellosolve acetate, 50/50 and has the following constants:

| | |
| --- | --- |
| Percent N.V. | 60 |
| Viscosity (3.5 stokes) | N ½ |
| Acid number | 100.0 |
| Color | 5 |

EXAMPLE 5

This example illustrates the formation of a film employing the acidic polyesters of the present invention admixed with a known epoxy component.

The acidic polyester of Example 1 (60% N.V.) is mixed with an epoxidized mixture of 60 parts by weight soybean oil and 40 parts by weight linseed oil having an oxirane value of 7.35%. The solids ratio of acidic polyester to the epoxidized mixture is 1.5:1. The blend is reduced to 60% N.V. with mineral spirits and spread on a glass substrate 1.5 mils thick, and permitted to dry in air to form a cured film. The film passes a 500 gm. Zapon test in 8½ hours, has a Sward hardness number of 22 after 24 hours and 38 after one week, and has good mar-, xylol- and alkali-resistance after one week. A 3.0 mil film spread on a tin substrate (30–31 gage) has a G.E. Impact Test strength of 60.

Although the invention has been described in considerable detail with reference to certain preferred embodiments thereof, it will be understood that variations and modifications can be effected within the spirit and scope of the invention as described above and as defined in the appended claims.

What is claimed is:

1. An acidic polyester soluble in mineral spirits having an acid value of at least 50, said polyester being the esterification reaction product of:
   (a) a polycarboxylic acid and
   (b) the alcoholysis product of
      (1) a triglyceride oil and
      (2) a polyhydric alcohol having on the average at least 2.5 hydroxyl groups wherein the triglyceride oil is present in an amount sufficient to render the polyester soluble in mineral spirits and wherein the ratio of carboxyl to hydroxyl groups is between 1.5:1 and 2.5:1.

2. The acidic polyester of claim 1 wherein the polycarboxylic acid comprises at least some chlorendic acid.

3. The acidic polyester of claim 1 wherein the polycarboxylic acid comprises chlorendic acid and at least one other dicarboxylic acid.

4. The acidic polyester of claim 1 wherein the molar ratio of the triglyceride oil to the polyhydric alcohol is between 0.1:1 and 2.0:1; and wherein the acidic polyester has an acid value of 85 to 120.

5. The acidic polyester of claim 1 wherein the molar ratio of the triglyceride oil to the polyhydric alcohol is between 0.3:1 and 1.0:1.

6. The acidic polyester of claim 1 having a hydroxyl value of less than 10.

7. The acidic polyester of claim 1 wherein said acidic polyester is the esterification reaction product of:
   (a) a polycarboxylic acid comprising a mixture of chlorendic acid and phthalic anhydride
   (b) the alcoholysis product of
      (1) a naturally occurring triglyceride oil and
      (2) pentaerythritol.

8. An acidic polyester of claim 1 having an acid value of at least 50 said polyester being the esterification reaction product of:
   (a) a mixture of chlorendic and phthalic acids and,
   (b) the alcoholysis product of
      (1) a triglyceride oil and
      (2) pentaerythritol wherein the molar ratio of oil to pentaerythritol is between 0.1:1 and 2.0:1 and wherein the ratio of carboxylic groups supplied by the mixture of acids to hydroxyl groups present in the initial unreacted pentaerythritol is between 1.5:1 and 2.5:7.

9. A process for producing the acidic polyesters of claim 1 comprising in sequence the steps of:

(I) interesterifying
      (A) a triglyceride oil and
      (B) a polyhydric alcohol having on the average at least 2.5 hydroxyl groups to form an alcoholysis product;
   (II) esterifying the alcoholysis product with a polycarboxylic acid;

wherein the molar ratio of A:B is between 0.3:1 and 1.0:1 and wherein the ratio of carboxyl groups to hydroxyl groups is between 1.5:1 and 2.5:1.

10. A composition of matter comprising the acidic polyester of claim 1 and mineral spirits.

11. The composition of claim 10 wherein the mineral spirits comprise at least 60% by volume of saturated hydrocarbons.

12. The composition of claim 10 wherein the mineral spirits consist essentially of saturated hydrocarbons.

13. The composition of claim 10 having a non-volatile content of 30 to 70%.

14. A coating composition comprising the acidic polyester of claim 1, mineral spirits, and an epoxy component.

References Cited

UNITED STATES PATENTS

| 2,181,893 | 12/1939 | Hopkins et al. | 260—22 |
| 3,196,117 | 7/1965 | Boller | 260—22 |
| 3,196,119 | 7/1965 | Boller et al. | 260—22 |
| 3,218,274 | 11/1965 | Boller et al. | 260—22 |
| 3,325,428 | 6/1967 | Graver et al. | 260—22 |
| 3,379,548 | 4/1968 | Jen | 260—22 |

DONALD E. CZAJA, Primary Examiner

R. W. GRIFFIN, Assistant Examiner

U.S. Cl. X.R.

117—124, 132, 161; 260—18, 33.6